United States Patent [19]

Kolycheck

[11] 4,442,282

[45] Apr. 10, 1984

[54] POLYURETHANE COVERED GOLF BALLS

[75] Inventor: Edmond G. Kolycheck, Lorain, Ohio

[73] Assignee: The B. F. Goodrich Company, Akron, Ohio

[21] Appl. No.: 505,585

[22] Filed: Jun. 20, 1983

[51] Int. Cl.³ ................ C08G 18/42; A63B 37/12
[52] U.S. Cl. .................... 528/83; 273/235 R
[58] Field of Search ........................... 528/83

[56] References Cited

U.S. PATENT DOCUMENTS

| | | | |
|---|---|---|---|
| 2,861,981 | 11/1958 | Frank et al. | 528/83 |
| 3,034,791 | 5/1962 | Gallagher | 528/63 |
| 3,974,238 | 8/1976 | Schweiker et al. | 525/288 |
| 3,975,461 | 8/1976 | Yamawaki et al. | 525/288 |
| 3,979,126 | 9/1976 | Dusbiber | 524/297 |
| 3,989,568 | 11/1976 | Isaac | 525/453 |
| 4,056,269 | 11/1977 | Pollitt et al. | 525/301 |
| 4,068,849 | 1/1978 | DiSalvo et al. | 528/75 |
| 4,123,061 | 10/1978 | Dusbiber | 528/63 |
| 4,248,432 | 2/1981 | Hewitt et al. | 528/83 |
| 4,284,750 | 8/1981 | Amirsakis | 528/83 |

*Primary Examiner*—H. S. Cockerman
*Attorney, Agent, or Firm*—J. Hughes Powell, Jr.

[57] ABSTRACT

A novel thermoplastic polyesterurethane for golf ball covers comprises the reaction product of a 1,12-dodecanedioc acid polyester having a molecular weight from about 1500 to 5000 reacted with diphenylmethane-4,4'-diisocyanate, and which is readily molded around a golf ball core to provide excellent golf balls.

3 Claims, No Drawings

POLYURETHANE COVERED GOLF BALLS

BACKGROUND OF THE INVENTION

Among the many synthetic polymers proposed as substitutes for the naturally occurring and expensive balata used in the past for golf ball covers are the polyurethanes. One such polyurethane is described in U.S. Pat. No. 3,034,791. The polyurethane described in this patent is the reaction product of poly(tetramethylene ether) glycol, an isomeric mixture of toluene -2,4-diisocyanates, toluene-2,6-diisocyanate and 4,4'-methylenebis(2-chloroaniline). This material has a number of processing disadvantages. A more recent U.S. Pat. No., 4,248,432, describes an improved polyurethane golf ball cover material. This polyurethane is the reaction product of an aliphatic diol and an aliphatic dicarboxyluc acid containing 4 to 8 carbon atoms, the polyester having a molecular weight of 800 to 1500, reacted with paraphenylene diisocyanate to form a polyesterurethane having a melt index in the range of 15 to 50. Polyurethanes having an even better balance of processing and physical properties than this polyurethane are an object of this invention.

SUMMARY OF THE INVENTION

Improved golf ball covers and resulting golf balls are obtained when the cover comprises the novel polyurethane reaction product of polyester glycols of aliphatic glycols containing 2 to 8 carbon atoms and 1,12-dodecandioc acid, said polyesters having molecular weights of greater than about 1500 to about 5000, reacted with diphenylmethane-4,4'-diisocyanate.

DETAILED DESCRIPTION

A critical feature of the polyurethanes of this invention is in the use of 1,12-dodecanedioc acid in the polyester. When azelaic acid, $HO_2C(CH_2)_7CO_2H$, and sebacic acid, $HO_2C(CH_2)_8CO_2H$, are substituted for the 1,12dodecanedioc acid, $HO_2C(CH_2)_{10}CO_2H$, polyurethanes are obtained that do not have utility in golf ball cover applications. The azaleic acid based polyesterurethane are too soft to mold when heated to processing temperatures, and the sebacic acid based polyesterurethane has lower melting and crystallization temperatures than the 1,2-dodecanedioc acid based polyesterurethane, and very high and unacceptable heat deformation.

Another critical and novel feature of the compositions of this invention is the use of the diphenylmethane-4,4'-diisocyanate. Normally, use of this diisocyanate to make polyurethanes for golf ball cover applications has not been successful. The polyurethanes do not exhibit the required melting and adhesion characteristics. Quite unexpectedly, it was found that when diphenylmethane-4,4'-diisocyanate is reacted with the defined 1,12-dodecanedioc acid polyester a polyurethane is obtained that is readily processed into golf ball covers to provide balls that have compressions comparable to balata covered golf balls, that do not heat deform, and that result in covercore amalgamation superior to that of the polyurethane described in U.S. Pat. No. 4,248,432.

The polyesters are readily prepared from aliphatic glycols containing 2 to 8 carbon atoms, including for example ethanediol, butanediol-1,4, hexanediol-1,6, and the like. Preferred polyesters are obtained from glycols containing 4 to 6 carbon atoms. The polyesters have molecular weights in the range of greater than about 1500 to 5000, usually about 2000 to 4000. Usually golf ball cover stock with polyesters having molecular weights of about 1000 do not have optimum physical properties.

The molar ratio of diphenylmethane-4,4'-diisocyanate to polyester used is from about 0.96 to about 1.04 mols of diisocyanate per mol of polyester, preferably about 0.98 to about 1.02 mols of diisocyanate per mol of polyester.

The melting temperature range of the polyesterurethane, as exhibited by a minimum in the endotherm of a differential scanning calorimeter thermogram made on a thermal analyzer (Dupont 990) at a programmed heating and cooling rate of 10° C. per minute, is important to obtaining satisfactory results in improved golf ball covers, and is greater than 60° C. up to about 95° C. Preferably the melting temperature is in the range of about 70° to 80° C. A particularly useful range is 70° to 75° C.

The crystallization temperature of the polyesterurethane, as exhibited by a maximum in the extotherm of a differential scanning calorimeter thermogram made on the thermal analyzer at a programmed heating and cooling rate of 10° C. per minute, is also important to obtain satisfactory results in improved golf ball covers and is greater than about 37° C. to about 132° C.

The desired polyesterurethanes also have a melt index, determined according to ASTM D-1238, Procedure A, at a barrel temperature of 175° C., a 6 minute preheat, and a 2160 gram load, in the range of about 1 to 10 grams/10 minutes.

The use of chain extenders in making the polyurethanes is not normally desired and may result in polyurethanes that do not have the desired balance of properties to provide good golf ball covers. Similarly, the use of curing or crosslinking agents is not desired because of the resulting handling difficulties in the plant, both in compounding and hold-up before molding, and since a thermoplastic polyurethane is then not obtained.

These polyesterurethanes may be used to make both 2 piece and 3 piece golf balls by any of the techniques now being used and well known in the golf ball art. The covers from the defined polyesterurethanes may be injection molded or compression molded, and in either case provide satisfactory golf balls having a satisfactory balance of good physical properties. In compression molding, for example, two separate pieces of the polyesterurethanes are formed and then placed in a mold around the golf ball core at temperatures normally greater than about 250° F. to about 300° F. for about 5 minutes and allowed to cool down in the mold. 275° to 280° F. is the usual operating range.

The polyesters are readily prepared by conventional techniques. The diol and acid are charged to vessel equipped with an agitator, using a molar excess of diol, and the mixture heated to 200° C. Stannous chloride catalyst is charged to the reaction mixture and the reaction allowed to proceed under vacuum until the desired molecular weight polyester, having an acid number less than about one, is obtained. During the reaction samples are taken and tested for hydroxyl and acid numbers.

Two different molecular weight polyesters of butanediol-1,4 and 1,12-dodecandioc acid were prepared following the procedure set forth above. For the first polyester, 69.5 weight percent (42.9 mol percent) of 1,12-dodecanedioc acid and 30.5 weight percent (57.1 mol 115 percent) of butanediol-1,4 were charged to the reactor. 50 ppm of stannous chloride was added as a catalyst. The resulting poly(tetramethylene dodecanedioate)glycol had a molecular weight of 3500. In the second preparation, 69.1 weight percent of 1,12-dodecanedioc acid (46.7 mol percent) and 30.9 weight percent of butanediol-1,4(53.3 mol percent) were reacted with 50 ppm of stannous chloride, a molecular weight of the polyester 2258.

The poly(tetramethylene dodecanedioate) glycol having a molecular weight of 3500 was reacted with diphenylenemethane-4,4'-diisocyanate to form the polyesterurethane by heating 94.096 weight percent (53.237 mol percent of the polyester) to about 105° C., and while stirring the molten polyester, 5.904 weight percent (46.763 mol percent) of diphenylmethane-4,4' diisocyanate and 187 ppm of stannous octoate catalyst were added. At this point compounding additives such as titanium dioxide and other pigments, processing aids as wax and molding aids such as fatty acid esters of dihydric alcohols may be added if desired. It is an advantage of these polyesterurethanes that such aids are not normally necessary, and in these examples are not added. The resulting mixture was stirred for three minutes to 180° C. The polymer was poured onto a tray and allowed to cool. After one week, this polyesterurethane had a melt index of 3.6 determined according to ASTM D-1238, Procedure A, at a barrel temperature of 175° C., a 6 minute preheat, and a 2,160 piston load. This example was repeated with the poly(tetramethylene dodecanedioate)glycol having a molecular weight of 2258. 90.131 weight percent (50.27 mol percent) of polyester was reacted with 9.869 weight percent (49.73 mol percent) of diphenylmethane-4,4'-diisocyanate to form the polyesterurethane having a melt index of 3.5.

Samples of these polyesterurethanes were compression molded into half-shells and cooled. Thereafter the half-shells were positioned in a mold on either side of a golf ball core comprising a solid center and a rubber thread winding, and molded at 280° F. for 5 minutes and cooled in the mold. The resulting golf balls were found, as compared to balata covered three piece balls, to have equivalent and comparable compression, amalgamation, uniformity and heat deformation. The balls had satisfactory driving characteristics. This balance of desirable physical properties indicates excellent and uniform adhesion to the rubber threads of the golf ball cores. There was excellent amalgamation and physical adhesion of the rubber threads to the inner surface of the defined polyesterurethane golf ball cover. Amalgamation is how well the cover material penetrates the surface windings of the ball. If the adhesion to the rubber winding is not good, durability is harmed, the cover will distort and the balls tend to be "out of round" and have an undesirable loss of compression. It is one of the advantages of the polyesterurethanes of this invention that excellent and uniform adhesion to and amalgamation with the rubber winding is obtained without noticeable degradation or destruction of these rubber windings.

Other useful polyurethanes were prepared as described with the 3500 molecular weight poly(tetramethylene dodecanedioate)gylcol, with (1) slightly less and (2) slightly more of the diisocyanate. The resulting polyurethanes had the following physical properties. Sample (1) had a melt index of 9.04, a Brookfield viscosity, 15 weight percent solution in tetrahydrofuran, of 520 cps, a tensile strength of 4300 psi, a 100% modulus of 1200 psi, a 300% modulus of 1250 psi, an elongation of 700%, a Shore D durometer hardness of 50, a room temperature compression set of 56.72, Vicat values of 63/63° C., and a room temperature stiffness of 42,608 psi. The second sample (2) had a melt index of 1.02, a Brookfield Viscosity of a 15 weight percent solution in THF of 3900 cps, tensile strength of 5300 psi, 100% modulus of 1150 psi, 300% modulus of 1200 psi, elongation of 680%, Shore D durometer values of 49, room temperature compression set 50.00, Vicat values of 60/62 and a room temperature stiffness of 32,161 psi.

For comparison with the novel 1,12-dodecanedioc acid based polyesterurethanes of this invention, two other polyesters were prepared from (I) azelaic acid, and (II) sebacic acid reacted with diphenylmethane-4,4'-diisocyanate and evaluated as golf ball covers. The polyesters were prepared following the procedure used for the poly(tetramethylene dodecanedioate)glycol. A poly(tetramethylene azelate)gylcol polyester having a molecular weight of 3600 was prepared from 65.5 weight percent (47.6 mol percent) azelaic acid, 34.5 weight percent (52.4 mol percent) butanediol-1,4 and 25 ppm stannous chloride. A poly(tetramethylene sebacate)glycol polyester having a molecular weight of 3508 was prepared from 67.1 weight percent sebacic acid (47.6 mol percent), 32.9 weight percent (52.4 mol percent) butanediol-1,4 and 50 ppm stannous chloride.

The polyesterurethanes were prepared by reacting (I) 93.0 weight percent of poly(tetramethylene azelate) glycol with 2.0 weight percent diphenylmethane-4,4'-diisocyanate and 25 ppm stannous octoate, and (II) 93.5 weight percent poly(tetramethylene sebacate)glycol and 6.5 weight percent diphenylmethane diisocyanate. The azelaic acid based polyesterurethane (I) was too soft to mold at normal processing temperatures and could not be used for golf ball covers. The sebacic acid based polyesterurethane (II) could be molded into golf ball covers and while amalgamation was fairly satisfactory, the heat deformation was very high and this polyesterurethane is also unacceptable for use as a golf ball cover.

Three piece golf balls, as is well known in the art, normally comprise solid or liquid centers, rubber thread windings and a cover. The polyesterurethanes of this invention are particularly useful in a three piece ball. The two piece ball normally comprises a solid core and a cover. Such core is normally a vulcanized rubber core. The polyesterurethanes of this invention also provide satisfactory 2 piece golf balls when injection molded over a solid cured rubber core.

The excellent adhesion to the core and other good physical properties obtained with the defined polyesterurethanes were obtained using substantially the polyesterurethanes as is in a thermoplastic state without the necessity for adding the usual compounding ingredients, although they may be used if desired, titanium dioxide for example, and without a curing or crosslinking agent.

I claim:

1. A golf ball comprising a core and a polyesterurethane cover comprising the reaction product of a polyester of an aliphatic diol containing 2 to 8 carbon atoms and 1,12-dodecanedioc acid, said polyester having a molecular weight of about 1500 to about 5000, reacted with diphenylmethane-4,4'-diisocyanate in a molar ratio of about 0.96 to 1.02 mols of diisocyanate per mol of polyester, the melt index of the polyesterurethane being in the range of about one to ten.

2. A golf ball of claim 1 wherein said glycol contains 4 to 6 carbon atoms, the polyester molecular weight is about 2000 to 4000 and the molar ratio of diisocyanate to polyester is 0.98 to 1.01.

3. A golf ball of claim 1 wherein said golf ball is a three piece golf ball comprising a liquid or solid center, rubber winding and said polyesterurethane as a cover therefor.

* * * * *